United States Patent Office 3,634,253

Patented Jan. 11, 1972

3,634,253

MAGNETIC RECORDING MEDIUM

Goro Akashi, Masaaki Fujiyama, Takashi Hirakawa, and Osamu Suzuki, Odawara, Japan, assignors to Fuji Photo Film Co., Ltd., Kanagawa, Japan No Drawing. Continuation-in-part of application Ser. No. 676,028, Oct. 18, 1967. This application Aug. 31, 1970, Ser. No. 68,554

Claims priority, application Japan, Oct. 24, 1966, 41/70,093

Int. Cl. H01f *1/26;* G11b *5/70*

U.S. Cl. 252—62.54 3 Claims

ABSTRACT OF THE DISCLOSURE

A magnetic recording medium having excellent frequency characteristics and preventing creaking phenomena, having a magnetic recording layer consisting of a powdered magnetic recording material dispersed in a resinous binder, characterized by the addition to said binder of a monobasic acid selected from the group consisting of linoleic acid, linolenic acid, caprylic acid, capric acid and lauric acid, in a proportion of from about 0.5 to 10 parts by weight per 100 parts by weight of said magnetic material is disclosed.

CROSS-REFERENCE TO RELATED APPLICATIONS

This application is a continuation-in-part application of our copending application Ser. No. 676,028, filed Oct. 18, 1967 now abandoned.

BACKGROUND OF THE INVENTION

(1) Field of the invention

The present invention relates to a magnetic recording medium, such as, an audio tape, a memory tape or a video tape with which excellent frequency characteristics are exhibited and in which creaks and such abnormal phenomena, when the tape is running, are minimized.

(2) Description of the prior art

In general, a magnetic recording medium is provided by dispersing iron oxide powder or an alloy powder having a grain diameter of about 0.1 to 1 micron in a suitable binding agent and then applying the resulting dispersion on a support film, such as, polyethylene terephthalate, triacetyl cellulose or polyvinyl chloride, followed by drying.

Properties required for a binding agent, suitable for such a magnetic recording layer, are as follows:

(1) Low head abrasion.
(2) Low adhesion to the tape guide in a recorder.
(3) Low adhesion to the tape guide or to other tapes due to softening of the binding agent, even at a high temperature and high humidity; and
(4) A suitable softness even at a low or high temperature.

In order to meet the foregoing requirements, the binding agent must have the following components in combination:

(1) A resin having such a good dispersiveness that the dispersion of the magnetic material is kept high and the abrasion of the head can be avoided;
(2) A plasticizing agent for giving a suitable softness, and
(3) A lubricant for lowering the abrasion coefficient.

In known magnetic recording media, vinyl chloride/vinyl acetate copolymers, polyurethane resins, acrylic resins or synthetic rubbers have been used as the dispersive resin; TCP (tricresyl phosphate), DBP (dibutylphthalate), or triacetin have been used as the plasticizing agent; and silicone oil, graphite or molybdenum disulfide have been used as the lubricant for the purpose of meeting the foregoing requirements. However, magnetic recording media, composed of such compositions, have disadvantages such as the tendency to cause an "abnormal creaking phenomenon", while the foregoing requirements are essentially satisfied. This "abnormal creaking phenomenon" is generally a very low sound generated at the starting of a tape or during running thereof. Therefore, the presence of this phenomenon cannot be confirmed unless the measurement is conducted by raising the sound, for example, +10 db or more higher than the standard level. This phenomenon has lately been found as the characteristics of magnetic recording media are now well known.

The creaking phenomenon designated in the invention means a generation of friction sound when the tension of a tape or the relative velocity of a tape and a guide roll, impedance roll, head, etc., is fluctuated during operation of a tape recorder. In order to prevent the friction sound, a smooth sliding of the tape is required throughout the entire range of relative velocities.

A method is known for minimizing the effect of this abnormal creaking phenomenon and comprises the incorporation of oleic acid into the binder used in the magnetic recording medium. However, magnetic recording media wherein oleic acid has been incorporated does not exhibit excellent frequency requirements necessary for magnetic recording media.

It is an object of this invention to provide a magnetic recording medium having excellent frequency characteristics.

It is also an object of this invention to provide a magnetic recording medium wherein the above-described disadvantages of conventional binding agents are eliminated or minimized.

It is also an object of this invention to provide a magnetic recording medium wherein exuding from the binder does not occur.

SUMMARY OF THE INVENTION

This invention has as its objects a magnetic recording medium having excellent frequency characteristics, exhibiting low creaking or friction sound and minimizing exuding of the binder. The invention comprises a magnetic recording medium having a magnetic recording layer comprising a powdered magnetic recording material, a resinous binder and a mono-basic acid selected from the group consisting of capric, caprylic, lauric, linoleic and linolenic acid.

DETAILED DESCRIPTION OF THE INVENTION

The magnetic recording medium of this invention has a magnetic recording layer consisting of a powdered magnetic recording material, a resinous binder and a monobasic acid selected from the group consisting of capric, caprylic, lauric, linoleic and linolenic acids.

As the powdered magnetic recording material, any of the conventional recording materials, such as $\gamma$-$Fe_2O_3$, can be used.

Suitable examples of the resinous binders are any of the conventionally used binders such as vinyl chloride/vinyl acetate copolymers, methacrylic acid polymers, acrylic acid polymers, polyurethanes, vinylidene chloride/acrylic acid esters copolymers and synthetic rubbers. Generally, the binder is used at a level of from 27 to 57 parts by weight for each 100 parts by weight of the powdered magnetic recording material.

Suitable solvents for the binders are conventional organic solvents such as the esters, for example, butyl acetate and ethyl acetate and such as ketones, for example, methyl ethyl ketone.

The plasticizing agent of this invention is selected from the group consisting of capric acid, caprylic acid, lauric acid, linoleic acid and linolenic acid. Generally, the plasticizing agent is used at a level of from 0.5 to 10 parts by weight for each 100 parts by weight of the powdered magnetic recording material.

The excellent frequency characteristics of the magnetic recording medium of this invention and the prevention of the abnormal creaking phenomenon will now be illustrated by reference to the following examples.

EXAMPLE I

To a composition consisting of 100 parts by weight of $\gamma$-$Fe_2O_3$, 24 parts by weight of a vinyl chloride/vinyl acetate copolymer, 10 parts by weight of a butyl acrylate polymer, 5 parts by weight of dibutyl phthalate was added, linoleic acid, linolenic acid, capric acid, caprylic acid or lauric acid in various amounts to prepare 5 different compositions. Each of the compositions thus prepared was respectively charged to a ball mill, using as the magnetic material $\gamma$-$Fe_2O_3$ having a length of 0.8 micron and a width of 0.15 micron. The materials were mixed and dispersed with 135 parts of butyl acetate for about 150 hours and then applied to a triacetyl cellulose base, 38 microns in thickness, so that the coating thickness was 13 microns on a dry basis. After application and drying, the film was slit in ¼ inch widths.

The surface characteristics of the thus obtained tape were measured in terms of the frequency characteristics with the frequency characteristics being measured by the difference between the output of 200 Hz. and that of 7 kHz. at a tape velocity of 19 cm./sec.

The results obtained are shown in Table 1.

TABLE 1

| Amount added, percent | Linoleic acid, db | Linolenic acid, db | Caprylic acid, db | Capric acid, db | Lauric acid, db |
|---|---|---|---|---|---|
| 0 | 0 | 0 | 0 | 0 | 0 |
| 0.5 | 0 | 0 | 0 | 0 | 0 |
| 1.0 | 0.2 | 0.5 | −0.2 | 0.3 | 0.5 |
| 2.0 | −0.3 | 0 | 0.5 | 0.2 | 0.2 |
| 5.0 | −1.0 | −0.7 | 0.3 | 0 | 0.4 |
| 10.0 | −0.8 | −0.6 | 0 | −0.1 | 0.3 |
| 15 | −0.8 | −0.95 | 0.1 | −0.5 | 0.1 |

As is clear from the results shown in the above table, no gradation in frequency characteristics was observed with linolenic, linoleic, caprylic, capric and lauric acids. Each of the acids used showed the excellent frequency characteristics obtainable with the magnetic recording medium of the present invention.

COMPARISON EXAMPLE 1

The magnetic recording composition as described in Example I was prepared but with the exception that oleic acid was used in varying amounts instead of the acids used in Example I. The same procedure followed in Example I was used to prepare a magnetic recording medium and the surface characteristics were evaluated as in Example I. The results obtained are shown in Table 2 below.

TABLE 2

| Amount added (percent) | Oleic acid (db) |
|---|---|
| 0 | 0 |
| 0.5 | −1.5 |
| 1.0 | −1.9 |
| 2.0 | −2.4 |
| 5.0 | −3.0 |
| 10.0 | −3.2 |
| 15 | −4.1 |

In comparing the results obtained in Example I with the results obtained in Comparative Example 1 it can be seen that the magnetic recording medium of the invention was markedly superior in frequency characteristics to the magnetic recording medium using the known oleic acid.

EXAMPLE II

| | Parts by weight |
|---|---|
| $\gamma$-$Fe_2O_3$ (magnetic iron powder) | 100 |
| Vinyl chloride/vinyl acetate copolymer | 24 |
| Butyl acrylate polymer | 10 |
| Dibutyl phthalate | 5 |
| Acid of the invention (cf. Table 3) | 3 |

EXAMPLE III

| | Parts by weight |
|---|---|
| $\gamma$-$Fe_2O_3$ (magnetic iron powder) | 100 |
| Vinyl chloride/vinyl copolymer | 24 |
| Butyl acrylate polymer | 10 |
| Dibutyl phthalate | 5 |
| Acid of the invention (cf. Tables 4 and 5) | 0.5–15 |

COMPARATIVE EXAMPLE 2

| | Parts by weight |
|---|---|
| $\gamma$-$Fe_2O_3$ (magnetic iron powder) | 100 |
| Vinyl chloride/vinyl acetate copolymer | 24 |
| Butyl acrylate polymer | 10 |
| Dibutyl phthalate | 5 |

Each of the compositions of the foregoing Comparative Example 2 and Example II–III was charged to a ball mill, using $\gamma$-$Fe_2O_3$ magnetic material having a length of 0.8 micron and a width of 0.15 micron. The materials were mixed and dispersed with 135 parts of butyl acetate for about 150 hours and then applied to a triacetyl cellulose base, 38 microns in thickness, so that the coating thickness was 13 microns on a dry basis. After the application and drying, the film was slit in ¼ inch widths. The thus obtained tape was subjected to sound recording and reproduction by means of a recorder having an impedance roller and the abnormal creaking sound during the reproduction was examined. The results obtained are as follows:

Examination of the creaky sound was carried out using the acids of this invention, caprylic acid, capric acid, lauric acid, linolenic acid and linoleic acid in Example II and compared with other acids such as stearic acid, palmitic acid and the known oleic acid as well as butyric and acetic acid. These results are shown in Table 3 below.

TABLE 3

| Additives | Abnormal creaky sound | Note |
|---|---|---|
| None—For comparison | Creaky sound | |
| Caprylic acid | No creaky sound | |
| Capric acid | do | |
| Lauric acid | do | |
| Linolenic acid | do | |
| Linoleic acid | do | |
| Palmitic acid | do | Blooming occurs. |
| Stearic acid | Slight creaky sound | |
| Oleic acid | No creaky sound | |
| Butyric acid | Small creaky sound | |
| Acetic acid | Creaky sound | |

As shown in Table 3 the acids of the invention have marked effect on preventing the abnormal creaky sound. In Example III the result of varying the amount of acid was examined.

TABLE 4

| Amount of lauric acid added | Abnormal creaky sound | Note |
|---|---|---|
| 0 | Creaky sound | |
| 0.5 | Small creaky sound | |
| 1.0 | No creaky sound | Exuding occurs. |
| 2.0 | do | Do. |
| 5.0 | do | Do. |
| 10.0 | do | Do. |
| 15 | do | Do. |

TABLE 5

| Amount of linoleic acid added | Abnormal creaking sound | Note |
|---|---|---|
| 0 | Creaky sound | |
| 0.5 | Slight creaky sound | |
| 1.0 | No creaky sound | |
| 2.0 | do | |
| 5.0 | do | |
| 10.0 | do | |
| 15.0 | do | Magnetic layer is softened and scratched. |

The results of Example III shown in Table 4 and Table 5 show that the effect of removing the creaking sound appears when acid in a proportion of 0.5 or more parts by weight is added and there is no creaky sound when added in a proportion of one or more parts.

EXAMPLE IV

Five different magnetic recording compositions having the following compositions (a)–(e) were prepared.

(a)

| | Parts by weight |
|---|---|
| $\gamma$-$Fe_2O_3$ | 100 |
| Nitrocellulose | 32 |
| Butyl acrylate polymer | 5 |

(b)

| | Parts by weight |
|---|---|
| $\gamma$-$Fe_2O_3$ | 100 |
| Vinyl chloride vinyl acetate copolymer | 24 |
| Butyl acrylate polymer | 10 |
| Dibutyl phthalate | 5 |

(c)

| | Parts by weight |
|---|---|
| $\gamma$-$Fe_2O_3$ | 100 |
| Polyurethane (prepolymer having —NCO radical at the end of chain) | 20 |
| Amine | 3 |
| Nitrocellulose | 14 |

(d)

| | Parts by weight |
|---|---|
| $\gamma$-$Fe_2O_3$ | 100 |
| Acrylic resin (vinylidene chloride/acrylic ester copolymer) | 35 |
| Dibutyl phthalate | 3.5 |

(e)

| | Parts by weight |
|---|---|
| $\gamma$-$Fe_2O_3$ | 100 |
| Hypalon (chlorinated rubber, trade name) | 40 |

To each of the above five compositions was added capric, caprylic, lauric, linoleic and linolenic acid in various amounts and the composition was charged respectively to a ball mill, using $\gamma$-$Fe_2O_3$ magnetic material having a length of 0.8 micron and a width of 0.15 micron, then mixed and dispersed with 135 parts of butyl acetate for about 150 hours, and then applied to a triacetyl cellulose base, 38 microns in thickness, so that the coating thickness was 13 microns on a dry basis. After the application and drying, the film was slit in ¼ inch widths.

The thus obtained magnetic tape was evaluated as to the exuding phenomenon. The results obtained are shown as follows. In the following table, the symbols have the following meaning:

Key to results below

A—Exuding phenomenon is not observed at all.
B—Exuding phenomenon is not observed, but the magnetic layer was softened on account of large amount of additive.
C—Exuding phenomenon is slightly observed.
D—Exuding phenomenon is observed.
E—Exuding phenomenon is markedly observed.

| Amount added (percent) | Composition (a) | (b) | (c) | (d) | (e) |
|---|---|---|---|---|---|
| Linoleic acid: | | | | | |
| 0 | A | A | A | A | A |
| 0.5 | A | A | A | A | A |
| 1.0 | A | A | A | A | A |
| 2.0 | A | A | A | A | B |
| 5.0 | A | A | B | A | B |
| 10.0 | B | B | B | B | B |
| 15 | B | B-C | C | B | C |
| Linolenic acid: | | | | | |
| 0 | A | A | A | A | A |
| 0.5 | A | A | A | A | A |
| 1.0 | A | A | A | A | B |
| 2.0 | A | A | A | A | B |
| 5.0 | A | A | B | B | B |
| 10.0 | B | B | B | B | B |
| 15 | B | C | C | B | C |
| Caprylic acid: | | | | | |
| 0 | A | A | A | A | A |
| 0.5 | A | A | A | A | A |
| 1.0 | A | A | A | A | A |
| 2.0 | A | A | A | A | A |
| 5.0 | A | A | B | A | B |
| 10.0 | B | B | B | B | B |
| 15 | B | B-C | C | B | C |
| Capric acid: | | | | | |
| 0 | A | A | A | A | A |
| 0.5 | A | A | A | A | A |
| 1.0 | A | A | B | A | A |
| 2.0 | A | A | B | A | A |
| 5.0 | A | B | B | A | B |
| 10.0 | B | B | B | B | B |
| 15 | B | B-C | C | B | B |
| Lauric acid: | | | | | |
| 0 | A | A | A | A | A |
| 0.5 | A | B | A | A | B |
| 1.0 | B | C | B | B | B |
| 2.0 | B | C | B | B | C |
| 5.0 | B-C | C | C | B-C | C |
| 10.0 | C | C | C | C | C |
| 15 | D | E | D | D | D |

From the above table, it is clear that the acids used are compatible with various types of conventional magnetic recording layers and that the exuding phenomenon rarely occurs.

In accordance with the invention, there is provided a magnetic recording material having excellent frequency characteristics free from abnormal creaking and for which exuding phenomenon is rarely observed. The amount of the acid of the invention used being suitably from 0.5 to 10 parts by weight for each 100 parts by weight of the powdered magnetic recording material, and the acid being selected from the group consisting of lauric acid, caprylic acid, capric acid, linoleic acid and linolenic acid. The preferred acids of this invention are caprylic acid, capric acid, linoleic acid and linolenic acid.

What is claimed is:

1. A magnetic recording medium having a magnetic recording layer comprising a powdered magnetic recording material, a resinous binder and from 0.5 to 10 parts by weight of a monobasic acid selected from the group consisting of capric, caprylic, lauric, linoleic and linolenic acid for each 100 parts by weight of the magnetic recording material.

2. The magnetic recording medium of claim 1, wherein said acid is selected from the group consisting of capric, caprylic, linoleic and linolenic acid.

3. The magnetic recording medium of claim 1, wherein said binder is used at a level of from 27 to 57 parts by weight to each 100 parts by weight of the powdered magnetic recording material.

References Cited

UNITED STATES PATENTS

| | | | |
|---|---|---|---|
| 3,470,021 | 9/1969 | Hendrick et al. | 252—62.54 X |
| 3,492,235 | 1/1970 | Matsumoto et al. | 252—62.54 |
| 3,505,109 | 4/1970 | Schnell et al. | 252—62.54 X |

TOBIAS E. LEVOW, Primary Examiner

A. P. DEMERS, Assistant Examiner

U.S. Cl. X.R.

117—235